US011131333B2

(12) United States Patent
Hollert et al.

(10) Patent No.: US 11,131,333 B2
(45) Date of Patent: Sep. 28, 2021

(54) SENSOR MODULE AND SENSOR MODULE MOUNTING FOR USE IN A STORAGE OR TRANSPORT SYSTEM

(71) Applicant: STEUTE TECHNOLOGIES GMBH & CO. KG, Löhne (DE)

(72) Inventors: André Hollert, Diepenau (DE); Carsten Both, Minden (DE)

(73) Assignee: STEUTE TECHNOLOGIES GMBH & CO. KG, Löhne (DE)

( * ) Notice: Subject to any disclaimer, the term of this patent is extended or adjusted under 35 U.S.C. 154(b) by 88 days.

(21) Appl. No.: 16/610,656

(22) PCT Filed: Jun. 8, 2018

(86) PCT No.: PCT/EP2018/065150
§ 371 (c)(1),
(2) Date: Nov. 4, 2019

(87) PCT Pub. No.: WO2018/224647
PCT Pub. Date: Dec. 13, 2018

(65) Prior Publication Data
US 2020/0072261 A1    Mar. 5, 2020

(30) Foreign Application Priority Data

Jun. 8, 2017   (DE) .................... 20 2017 103 460.7

(51) Int. Cl.
*F16B 2/12*       (2006.01)
*G01P 1/02*       (2006.01)

(52) U.S. Cl.
CPC ............... *F16B 2/12* (2013.01); *G01P 1/023* (2013.01)

(58) Field of Classification Search
CPC .................................. G01P 1/023; F16B 2/12
See application file for complete search history.

(56) References Cited

U.S. PATENT DOCUMENTS

| 1,760,346 A | 5/1930 | Correa |
| 2004/0051015 A1* | 3/2004 | Ohrling ................ A47B 96/065 248/214 |
| 2006/0113442 A1 | 6/2006 | Plate et al. |

FOREIGN PATENT DOCUMENTS

| AU | 583274 B2 | 12/1985 |
| DE | 202007012926 U1 | 2/2008 |
| GB | 1255078 A | 11/1971 |

(Continued)

OTHER PUBLICATIONS

International Search Report dated Aug. 30, 2018 in related/corresponding International Application No. PCT/EP2018/065150.

(Continued)

*Primary Examiner* — Walter L Lindsay, Jr.
*Assistant Examiner* — Andrew V Do
(74) *Attorney, Agent, or Firm* — Patent Portfolio Builders PLLC (57) ABSTRACT

A mounting of a sensor module for use in a storage or transport system, for securing the sensor module to a support of the storage or transport system. The mounting has a clamping device for clamping the mounting to the support, and the clamping device includes at least one slide which is guided in a linearly movable manner and latches in a plurality of latch positions.

16 Claims, 5 Drawing Sheets

(56) References Cited

FOREIGN PATENT DOCUMENTS

WO        0229259  A1      4/2002

OTHER PUBLICATIONS

Written Opinion dated Aug. 30, 2018 in related/corresponding International Application No. PCT/EP2018/065150.
Search Report dated Jun. 18, 2020 in related/corresponding DE Application No. 20 2017 103 460.7.

* cited by examiner

SENSOR MODULE AND SENSOR MODULE MOUNTING FOR USE IN A STORAGE OR TRANSPORT SYSTEM

BACKGROUND AND SUMMARY OF THE INVENTION

Exemplary embodiments of the invention relate to a sensor module mounting for use in a storage or transport system to secure the sensor module to a support of the storage or transport system, wherein the mounting has a clamping device to clamp the mounting to the support. The invention also relates to a sensor module for use in a storage or transport system with such a mounting.

In modern production plants as well as in logistics, storage or transport systems are used for material containers in which a material transport or material stock is recorded and monitored as automatically as possible. Such storage or transport systems include rack arrangements, as well as conveyor belts that are used to feed or remove material containers, for example to ship, process or store material. In the context of the application, a "material container" means boxes for holding piece goods or bulk goods as well as trays, pallets or the like.

For the detection of a material container, for example, a sensor module with a switch is known from the publication DE 20 2007 012 926 U1 in which a rocker mounted in a mounting can be pivoted in such a way that it is pivoted by a respectively positioned material container. The rocker is mechanically coupled to an actuating element of a switch mounted on the mounting, which is actuated when the rocker pivots. The rocker thus represents a probe of the arrangement.

A clamping device is described that can be used to clamp the mounting of the rocker to a support of the storage or transport system. One such support of the storage or transport system can be, for example, a so-called roller conveyor, in which a number of rollers are rotatably arranged in a U-shaped support on which material containers are placed. The clamping device in the printed publication DE 20 2007 012 926 U1 comprises a fixing bracket with a slotted hole and fixed to a base body of the mounting by a fixing screw. When the screw is loosened, the support of the storage and transport system is clamped between a free leg of the fixing bracket and the base body of the mounting. In this manually pretensioned position, the mounting is then fixed by tightening the aforementioned screw. The length of the free leg is adapted to the height of the support, wherein smaller differences in height can be compensated by an inserted sponge rubber element. With regard to the width, the arrangement is flexible due to the displaceability of the fixing bracket on the base element through the slotted hole.

However, the disadvantage here is the complicated handling, in which the base element and the fixing bracket must be braced against each other and fixed in this position by tightening the screw. Often the installation space for the sensor module is limited, e.g., on a roller conveyor as a support, and the screw for fastening the fixing bracket to the base element is difficult to access with a tool.

Exemplary embodiments of the present invention are directed to a mounting for a sensor module or a sensor module with such a mounting, in which mounting on a support of the storage or transport system can be carried out flexibly with regard to the dimensions of the support and quickly and without tools.

A mounting according to the invention of the type mentioned above is characterized in that the clamping device comprises at least one linearly displaceably guided slide that engages in a plurality of latching positions.

Due to the majority of latching positions, clamping to the support by the clamping device can be achieved by moving the slide without the need for a tool to then fix the clamping device in the desired position. In this way, the fixing of the mounting of the sensor mode and thus of the sensor module can be carried out simply and without tools. The displaceability and the plurality of latching positions allow flexible adaptation to supports of different dimensions.

In an advantageous embodiment of the mounting, a guide is arranged or formed on the mounting in which the at least one slide is guided. The guide preferably comprises at least one through which a T-shaped or dovetail-shaped guide is formed. For example, two parallel grooves spaced apart from each other can form a T-shaped guide in which the slide is guided. Such a guide can be advantageously designed in one piece with the base body of the mounting and can be produced, for example, by an injection molding process.

In a further advantageous embodiment of the mounting, the guide and the slide have a plurality of interlocking latching teeth forming the latching positions. The latching teeth of the guide can, for example, be arranged between parallel and spaced grooves. The latching teeth are preferably sawtooth shaped, so that a movement in one direction is possible, but is prevented in the other direction. The slide can thus be pushed towards the support to clamp and latch it in place without the need for manual fixing. To ensure that the latching teeth mesh securely, a spring element can be formed on the slide that presses the slide into the guide accordingly. The spring element can, for example, be a flared resilient tongue, which is arranged or integrally formed within the groove on the slide.

In a further advantageous embodiment of the mounting, a spring is optionally formed on the slide in addition to the spring element mentioned, which presses against the support to compensate for play. In particular, a geometry of the support in which it is narrower in the area where the spring acts than in other areas prevents possible tilting of the mounting relative to the support about its longitudinal axis.

In another advantageous embodiment of the mounting, the slide has a section without latching teeth on the side facing the latching teeth of the guide so that it can be levered out of the latching positions by tilting the slide. Handle elements are preferably designed on the slide in order to be able to tilt the slide. The handle elements include, for example, a handle eye and/or a pressure tab, in order to be able to tilt the slide with two fingers of one hand without tools and thus lever it out of the latching position.

In another advantageous embodiment of the mounting, an element is arranged on the slide with which the support can be enclosed. Preferably, the element comprises a further guide that guides a further slide in a linearly displaceable manner, wherein a plurality of latching positions for the further slide is also provided, preferably in the case of the further guide, and wherein the further slide has a clamping section for abutment against the support.

Similar to the aforementioned arrangement of guide and slide, the further guide and the further slide preferably have intermeshing latching teeth through which the latching positions are formed.

The guide and the other guide are preferably aligned crosswise, in particular perpendicular to each other. This allows flexible gripping and clamping of supports of different widths and heights.

A base body of the mounting preferably comprises a hook-shaped element for hooking into an edge of the support. This allows the mounting to be first hooked onto the edge of the support, positioned correctly and then fixed to the support by moving the slide or slides.

In a further advantageous embodiment of the mounting, the base body with the guide, the slide, if necessary with the further guide and/or the further slide with the clamping section are each made integrally of plastic. The entire mounting shown can thus be assembled from just a few individual parts. To provide protection against electrostatic discharges, conductive plastic can be used and/or a conductive coating applied.

A sensor module for use in a storage or transport system, which is in accordance with the invention, is characterized by such a mounting, in order to be able to be mounted in a clamping manner on a support of the storage or transport system. This results in the advantages described in connection with the mounting.

BRIEF DESCRIPTION OF THE DRAWING FIGURES

The invention is explained in more detail below with the help of figures. The figures show as follows.

DETAILED DESCRIPTION

Figure 1:
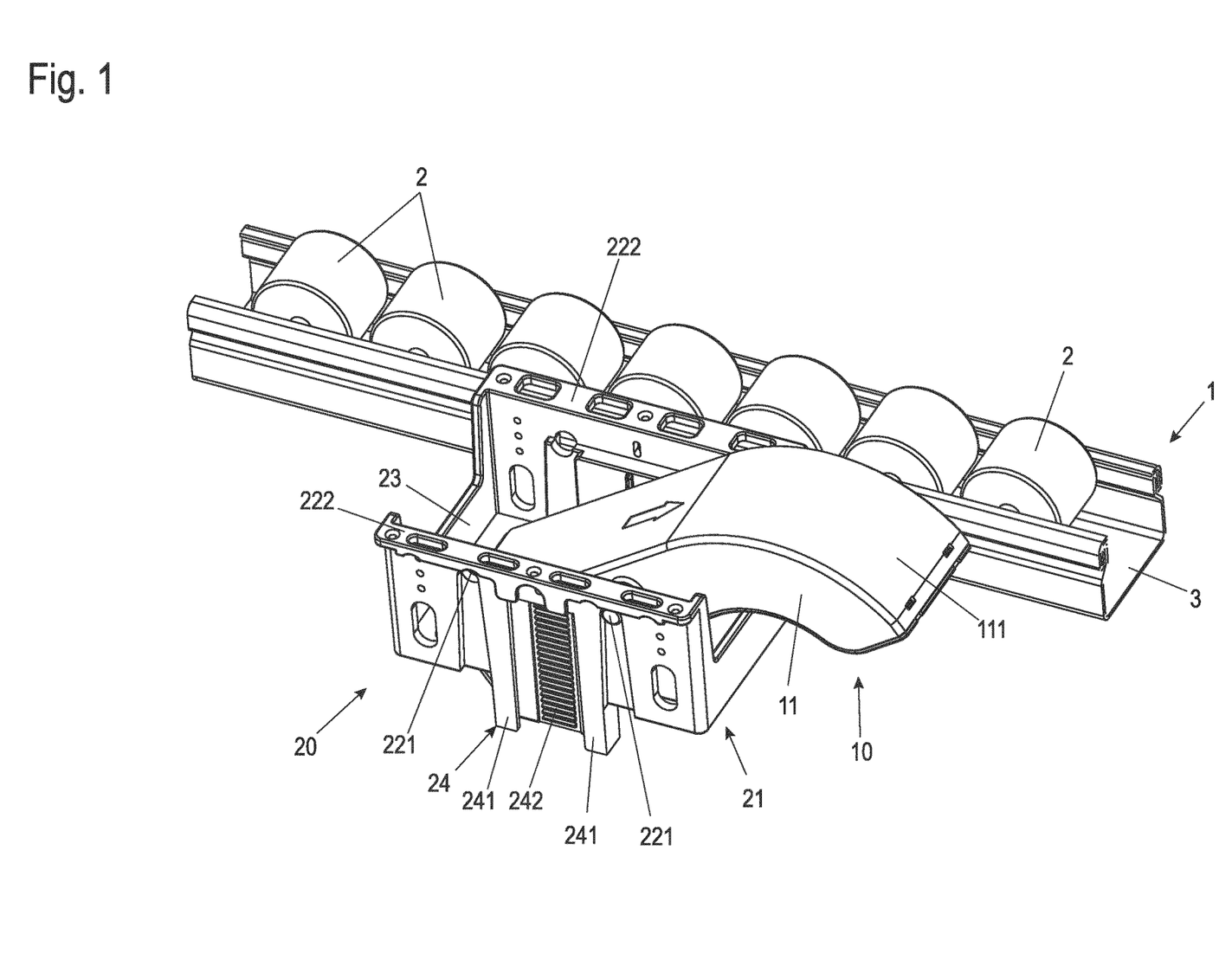
FIG. 1 shows an isometric representation of a sensor module attached to a roller conveyor of a storage or transport system.

FIG. 1 shows in an isometric oblique view from above a sensor module according to the application, mounted on a roller conveyor 1. The roller conveyor 1 has a plurality of rollers 2 arranged one behind the other, which are rotatably mounted in a U-shaped support 3. Such roller conveyors 1 are often used in storage or transport systems in order to accommodate placed material containers, such as material boxes, in an easily movable manner.

As a rule, at least two such roller conveyors 1 are arranged parallel to each other, wherein the sensor module is then preferably mounted between the roller conveyors 1. The material containers can also be transported on only one roller conveyor 1, in which case wider rollers, also known as cylinders, are generally used. A lateral guide for the material containers moving along roller conveyor 1 can be provided by a guide web on the material container, which is guided at the edges of the rollers 2 protruding upwards from roller conveyor 1. It should be noted that the arrangement shown in FIG. 1 can also be implemented in a very similar way with slide rails instead of roller conveyors for guiding the material containers.

The sensor module shown comprises a mounting 20 in which a rocker (switch) 10 is mounted so that it can be pivoted about a horizontal axis.

The rocker 10 has a housing 11 which is closed by a cover 12 on the underside. The inner structure of the rocker 10 is explained in more detail in connection with FIGS. 3 and 4.

The rocker 10 has a cuboid section located in the area of the mounting 20. Towards the top and to one side of the mounting 20, a curved section of the rocker 10 protrudes, which has approximately the shape of a segment of a cylindrical ring with a rectangular cross-section. On the upper side, the rocker 10 is limited accordingly by a convexly extending section of the housing 11, which forms a scanning surface 111 for a material container.

The mounting 20 has a U-shaped base body with a horizontally arranged base 21 and two side legs 22. In both side legs 22, opposite bearing positions 221 are formed, in which the rocker 10 is pivotably mounted with bearing pins not visible here. The illustrated mounting 20 has two pairs of opposite bearing positions 221. In the longitudinal direction of mounting 20, which extends horizontally and perpendicularly to the pivot axis, the two pairs of bearing positions 221 are arranged off-center in a left and right area of mounting 20. The pairs of bearing positions 221 shown can be used alternatively, depending on the direction in which the rocker 10 is inserted into mounting 20. In the example shown in FIG. 1, the rocker 10 is inserted into the pair of bearing positions 221 on the right in the figure and protrudes with the scanning surface 111 to the right beyond the mounting 20.

In addition to the base 21, side parts 23 are provided for the base body of the mounting 20, which connect the two side legs 22 to each other and give the mounting 20 stability. The side parts 23 also represent a stop for the rocker 10.

The sensor module is arranged in the area of the roller conveyor 1 in such a way that a material container placed on the roller conveyor or rolling over the roller conveyor 1 is located above the mounting 20. As FIG. 1 shows, the rocker 10 with the scanning surface 111 projects beyond the height of the rollers 2. A placed material container presses the rocker 10 downwards on its scanning surface 111 and thus pivots it clockwise (when viewing the arrangement of FIG. 1).

Once the material container has passed the sensor module or has been removed from the roller conveyor 1, the rocker 10 returns to the position shown in FIG. 1. The uprighting preferably occurs by means of gravity, which can be achieved, for example, such that a center of mass of the rocker 10 is not located in the area of the scanning surface 111, but in the part of the rocker 10 beyond the bearing pins when viewed from the scanning surface 111. The pivoting movement of the rocker 10 is detected to detect the passage or presence of the material container.

The functionality of the rocker 10 and the detection of the material container are explained in more detail below in connection with FIG. 2.

Figure 2:
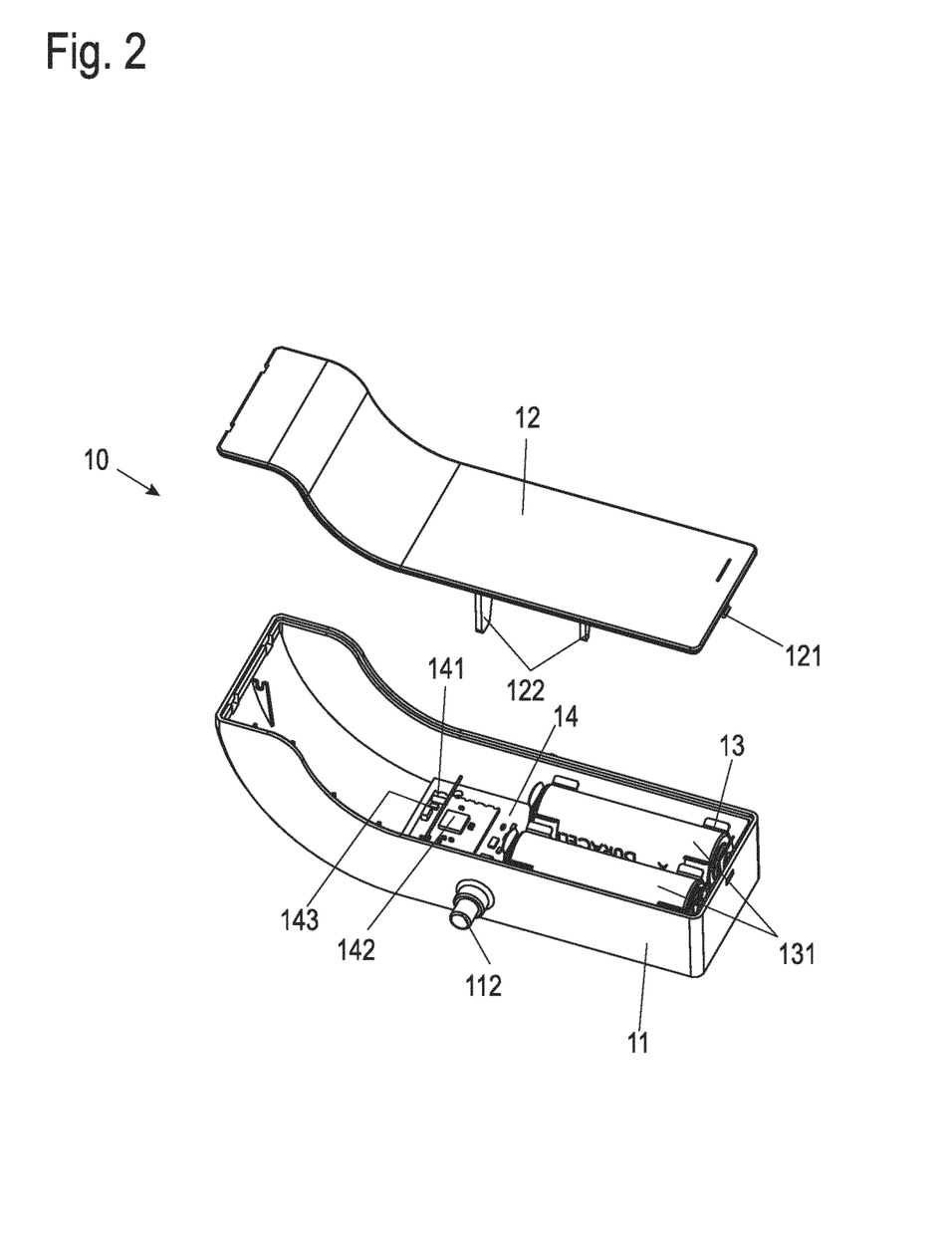
FIG. 2 shows an open rocker of the sensor module according to FIG. 1 in an isometric representation.

FIG. 2 shows the rocker 10 in an isometric representation without the mounting 20, wherein the cover 12 is lifted from the housing 11 to reveal the inner structure of the rocker 10. The rocker 10 is shown in FIG. 2 with a view to the underside of the rocker 10, i.e. to the side opposite the scanning surface 111.

A battery holder 13 is arranged in the rocker 10, for holding two batteries 131 by way of example in this case. Furthermore, a circuit board 14 is arranged in the housing 11 of the rocker 10, which accommodates electronic components, in particular an acceleration sensor 141, an evaluation unit 142 and a transmission device 143 for wireless transmission of signals to a receiver not shown here. The transmission device 143 comprises at least one transmitter, preferably in addition a receiver, in order to be able to transmit signals also bidirectionally or to enable handshake procedures during a transmission of data (i.e., digital signals).

The transmission device 143 preferably uses one of the approved frequency bands for the so-called ISM (Industrial, Scientific, Medical) application, for example in the range of 433 MHz (Megahertz), 868 MHz or 2.4 GHz (Gigahertz). A standardized transmission protocol, for example according to the Bluetooth or Zigbee standard, or a proprietary protocol can be used. A protocol that is associated with a low energy requirement is preferred, e.g., Bluetooth-LE (Low Energy), so that the radio sensor module can be supplied by the batteries 131 with a long service life, preferably in the range of several years with one battery set.

In FIG. 2 it is clearly visible that the area of the housing 11, which is located to the right of the bearing pins 112 in this figure, accommodates the battery holder 13 with the batteries 131, whereas in the area to the left the bearing pin 112 is essentially empty except for parts of the circuit board 14. This leads to a weight distribution, through which the rocker 10 pivots into the rest position within the mounting 20, without the restoring forces of a spring being necessary for this purpose. Alternatively, or additionally or in certain mounting positions, a spring can be provided to move the rocker 10 into the rest position.

The cover 12 is preferably clipped onto the housing 11. For this purpose, latching means 121 are provided on two or more side edges of the cover 12, which engage in corresponding counter latching elements of the housing 11.

On the inside of the cover 12 there are retaining webs which, when closing the housing 11 with the cover 12, press on inserted batteries 131 and on the circuit board 14 to hold them in position. For the placement of the circuit board 14, guide elements comparable with the retaining webs 122 are provided in the housing 11. The combination of these guide elements and the retaining webs 122 fixes the board 14 and thus also the battery holder 13 in such a way that the board 14 only needs to be inserted into the housing 11. In this way, a defective circuit board 14 can be easily replaced.

Preferably, all mechanical, electromechanical, electrical and/or electronic components used to detect a movement of the rocker 10 and to transmit the information about the movement of the rocker 10 are arranged in or on the rocker 10 itself. In this way a very simple system is created in which—apart from the bearing of the rocker 10 in the mounting 20—no mechanical active connection between the rocker 10 and the mounting 20 is necessary.

During installation or maintenance of the radio sensor module, the mounting 20 can be easily attached to the desired position using a clamping device described in more detail below and the rocker 10 can be inserted or replaced. By exchanging the rocker 10 all active components are exchanged so that the functionality of the radio sensor module is immediately restored. The system is accordingly service-friendly.

In the embodiment example shown, the position or angle of the rocker 10 is detected with the aid of the mentioned acceleration sensor 141. The acceleration sensor 141 can, for example, be designed as a micro-electromechanical system (MEMS). In this configuration, the acceleration sensor 141 is space-saving and also available at a reasonable price. Such MEMS acceleration sensors are widely installed in mobile devices such as smartphones or tablet computers and are cost-effective due to the large number of such devices.

Signals of the acceleration sensor 141 are evaluated by the evaluation unit 142, optionally after preprocessing. Preprocessing may include filtering and/or preamplification. The evaluation unit 142 preferably comprises a microcontroller.

From the information of the acceleration sensor 141, either a tilting position of the rocker 10 and/or a change in the angular position of the rocker 10 is determined, from which it is derived whether a material container is located in the area of the sensor module.

As an alternative to the described position or motion detection of the rocker 10 with the aid of the acceleration sensor 141, a mechanical switch can be arranged on the rocker to detect the position of the rocker. It is also possible to mount a switch in the area of the mounting 20, which is actuated by the rocker 10.

Figure 3:
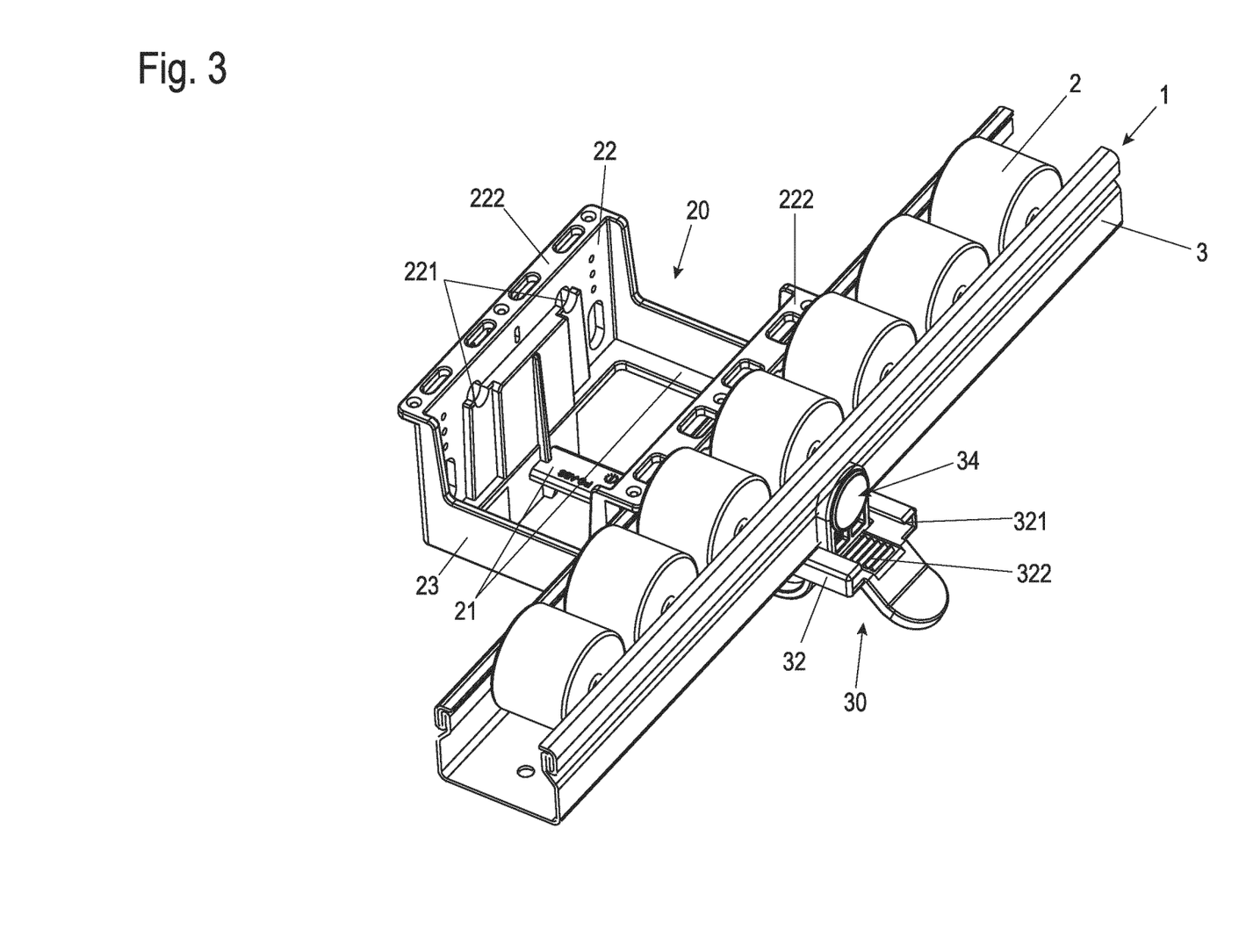
FIGS. 3, 4 show two different isometric representations of the mounting of the sensor module according to FIG. 1 without rocker inserted from different viewing directions.
Figure 4:
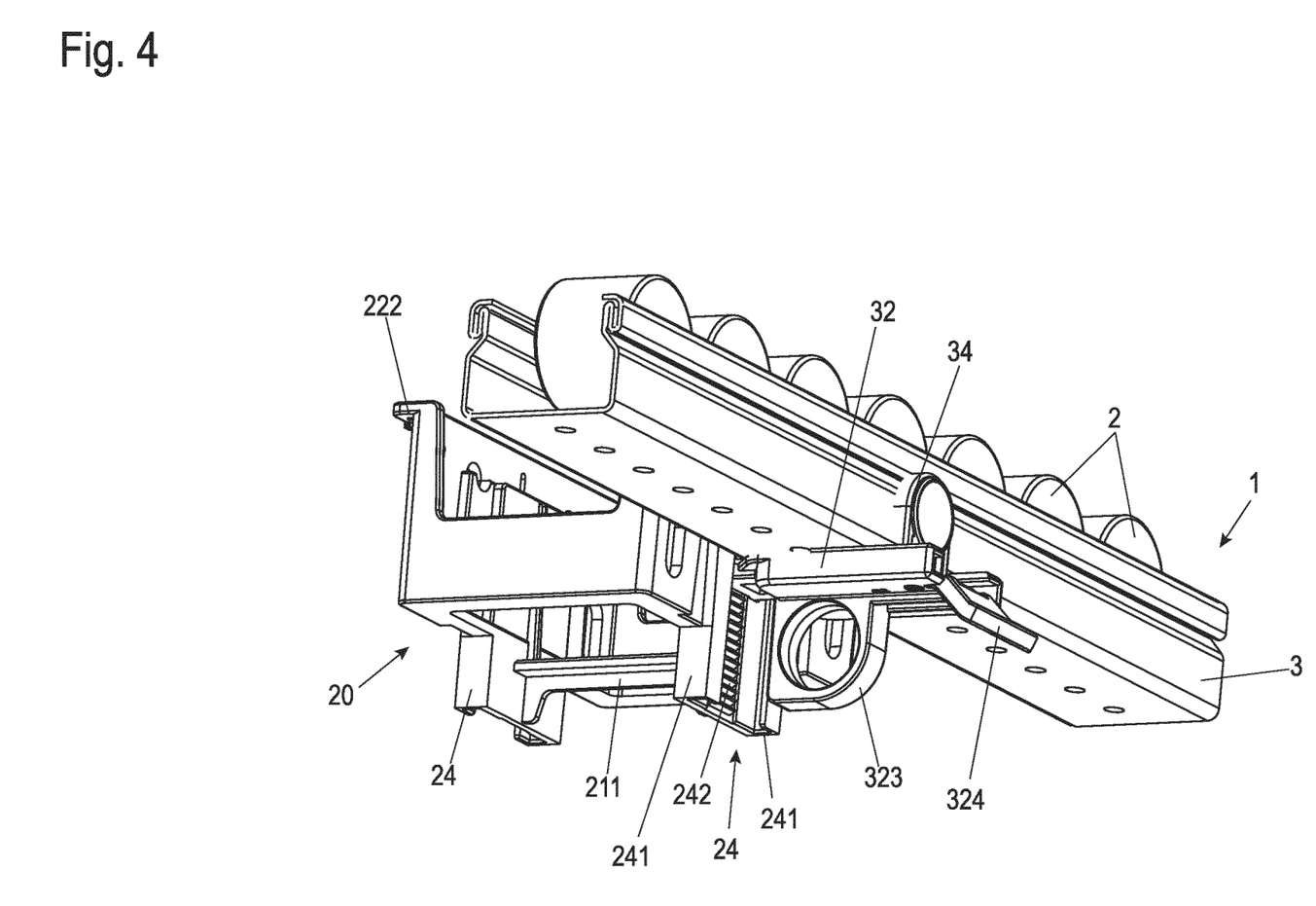
Figure 5:
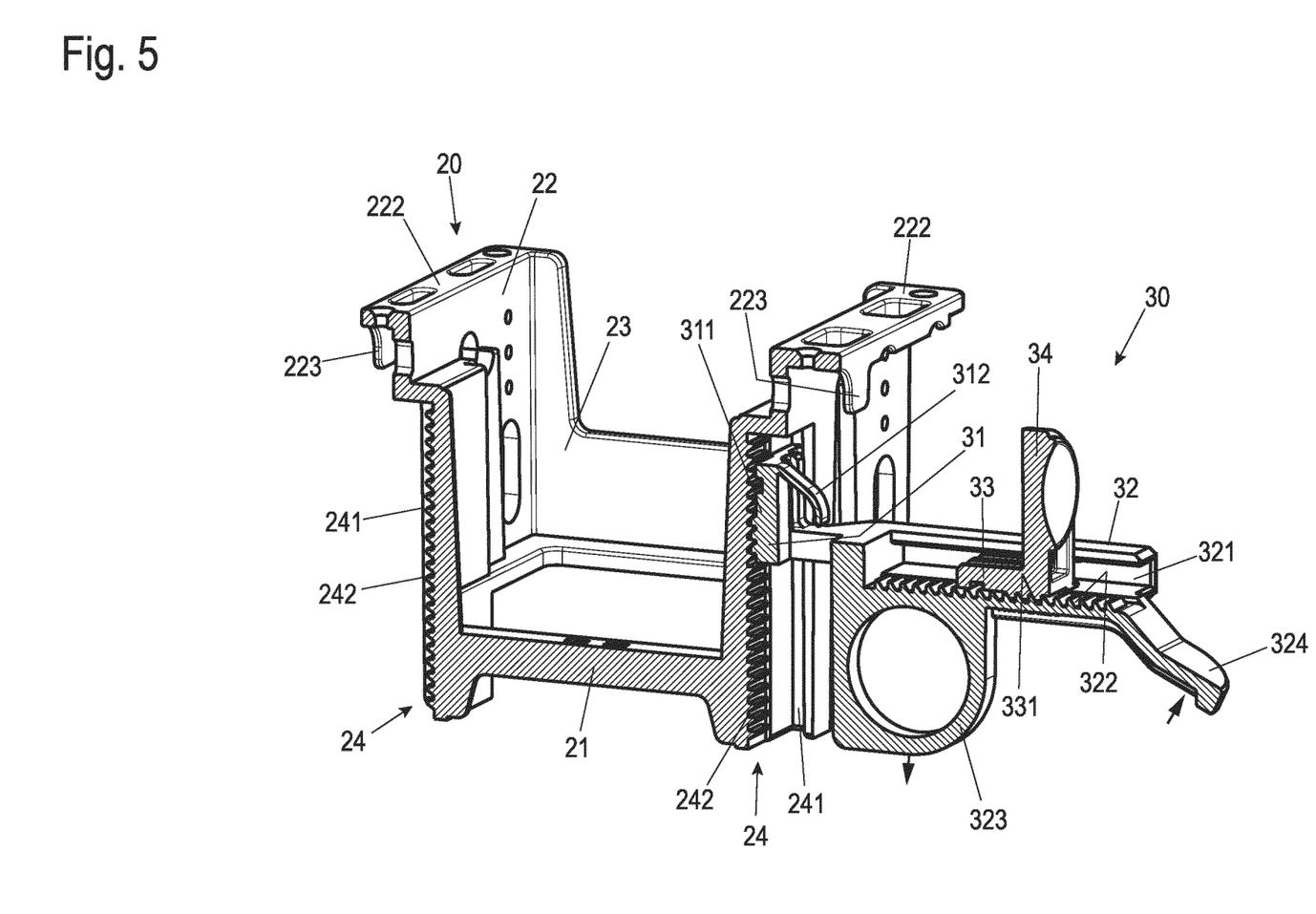
FIG. 5 shows an isometric sectional view of the mounting according to FIGS. 3 and 4.

In accordance with the application, the mounting 20 has a clamping device 30 in order to be mounted on the support of the storage and transport system, in this example the support 3 of the roller conveyor 1. Details of the clamping device 30 are explained below using FIGS. 3 to 5. FIGS. 3 and 4 show the arrangement according to FIG. 1 from different viewing directions, wherein for reasons of clarity the rocker 10 of the sensor module was taken from FIG. 1. FIG. 5 shows an isometric sectional view through the mounting 20 with the clamping device 30. The section is carried out in a vertical plane perpendicular to the transport direction of the roller conveyor 1.

For attachment to the U-shaped support profile 3, the mounting 20 has a laterally projecting collar 222 on the upper side 22 of its base body, in addition to the clamping device 30, which comprises an angled portion 223 at its end. This angled portion 223 can be formed over the entire length of the collar 222 or in the form of flaps only section by section.

The collar 222 and the angled portion 223 form a hook-shaped element that allows the base body of the mounting 20 to be hooked into one side of the U-shaped support 3. In order to enable the attachment of different roller conveyors 1 to different U-shaped supports 3, the collar 222 is wider on one side of the base body of the mounting 20 than on the opposite side. Since the base body of the mounting 20 is otherwise mirror-symmetrical, it can be turned so that the collar 222 is attached to the roller conveyors 1 with the appropriate width. In addition, the collar 222 can be formed in an interrupted way so that it can be cut off if none of the sides fits a support on which the sensor module is to be mounted. The mounting 20 can then no longer be hooked in but rests on the collar 222, which also determines the position of the base body of the mounting relative to the support 3.

A guide 24 aligned perpendicular to the collars 222 is arranged in the middle of both legs 22 of the base body of the mounting 20. This has two opposing guide grooves 241, as well as a grid with latching teeth 242 in the middle area.

As is shown in particular detail in FIG. 5, in which the mounting 20 is intersected in the area of the guide 24, a slide 31 is pushed into the guide 24, which can therefore be moved vertically from bottom to top in the guide 24 in the mounting position of the mounting 20. The slide 31 also has latching teeth 311 on its side facing the latching teeth 242, which engage in the latching teeth 242. Not visible in the illustrations is a spring element formed on the opposite side of the slide 31, which is supported within the groove 241, wherein the latching teeth 241, 311 are pressed against each other. The latching teeth 242, 311 are provided with a sawtooth profile, so that a movement of the slide 31 within the guide 24 from bottom to top is easily possible, a movement back however only if the latching teeth 242, 311 are actively lifted off from each other.

Due to the latching means formed by the latching teeth 241, 311, after hooking the collar 222 with the angled portion 234 into the support 3, the slide 31 can be pushed up in the direction of the underside of the support 3 until the cantilever formed on the slide 31, which is formed as a further guide 32, abuts against the underside of the support 3 and clamps the support 3 between itself and the collar 222. In addition, a spring 312 is formed on slide 31, which presses against the side leg of support 3. If the geometry of support 3 is unfavorable, spring 312 compensates for play between the base body of mounting 20 and support 3 in order to prevent the mounting 20 from tilting relative to support 3 about the longitudinal axis of mounting 20.

The further guide 32 is constructed similar to the guide 24, with oppositely disposed grooves 321, between which, in turn, latching means in the form of a plurality of successive latching teeth 322 are formed. Unlike guide 24, guide 32 continues in the horizontal direction. Another slide 33 is inserted into the further guide 32, which is also provided with latching teeth 331 and a spring element (not visible here) is supported within the groove 321. An upward clamping section 34 is arranged at an angle on the other slide 33, which presses against the outer side of the support 3 as seen from the mounting 20 when the other slide 33 is pushed in. The latching teeth 322 and 331 are also designed as saw teeth, which allow the further slide 33 to enter but prevent it from slipping back again. Accordingly, the support 3 can be clamped between the leg 22 and the clamping section 34 by pressing the clamping section 34 against the support 3. The latching can be released by lifting off the latching teeth 331 from the latching teeth 322.

Without tools, the two guides 24, 32 and the slides 31 and 33 which can be moved within them can therefore be used to grip and clamp the support 3 precisely to mount the mounting 20 on the support 3. The travel of the slides 31, 33 within the guide 24, 32 gives flexibility to clamp supports 3 of different heights or widths.

In order to release the clamping of the mounting 20 on the support 3 without tools, the latching teeth 311 on slide 31 in particular are only formed in a lower area of slide 31. When tilting the slide 31 counterclockwise, the upper part of the slide 31 rests on the latching teeth 311 or on the surface of the leg 22 in the area next to the latching teeth 311 and the latching teeth 311 are levered out of the latching teeth 242. The latching is thus released and the slide 31 can be moved downwards relative to the base body of the mounting 20, wherein the clamping device 30 can be released from the support 3.

In order to simplify the tilting and releasing of the clamping device 30, a handle eyelet 323 is formed on the underside of the further guide 32 on the side adjacent to the slide 31 and a pressure tab 324 on the opposite free end as handle elements. With one finger it is possible to engage in the handle eyelet 323 and with another finger of the same hand, for example the thumb, it is possible to press from below against the pressure tab 324. The direction of the applied forces is shown by arrows in FIG. 5. This movement allows the latching 30 to be released without tools in order to release the mounting 20 and thus the sensor module from a roller conveyor 1.

The individual components of the mounting 20 shown and in particular its clamping device 30 can be made in each case integrally from plastic in an injection molding process. The entire mounting 20 shown can thus be assembled from only three individual parts: the U-shaped base body of the mounting 20, on which the guide 24 is formed; the first slide 31 with the integrally formed further guide 32 and the handle elements; and the second slide 33 with the clamping section 34. To provide protection against electrostatic discharges (ESD), conductive plastic can be used and/or a conductive coating can be applied.

The example shows a sensor module with (switching) rocker 10. The mounting 20 can also be used to hold other sensors or (measuring) devices on a support of the storage and transport system, as the sensor module shown here for the detection of a material container.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

1 Roller conveyor
2 Roller
3 Support
10 Rocker
11 Housing
111 Scanning surface
112 Bearing pin
12 Cover
121 Latching means
122 Retaining web
13 Battery holder
131 Battery
14 Circuit board
141 Acceleration sensor
142 Evaluation unit
143 Transmission device
20 Mounting
21 Base
211 Web
212 Opening
22 Side leg
221 Bearing position
222 Collar
223 Angled portion
23 Side part
24 Guide
241 Groove
242 Latching teeth
30 Clamping device
31 Slide
311 Latching teeth
312 Spring
33 Further guide
321 Groove
322 Latching teeth
323 Handle eyelet
324 Pressure tab
33 Further slide
331 Latching teeth
32 Clamping section

The invention claimed is:

1. A mounting of a sensor module for use in a storage or transport system for fastening the sensor module to a support of the storage or transport system, the mounting comprising:
   a clamping device configured to clamp the mounting to the support,
   wherein the clamping device comprises at least one linearly displaceable guided slide that engages in a plurality of latching positions;
   a guide, in which the at least one linearly displaceable guided slide is guided, is arranged or formed on the mounting, wherein the guide and the at least one linearly displaceable guided slide have a plurality of interlocking latching teeth forming the plurality of latching positions; and
   a spring formed on the at least one linearly displaceable guided slide, wherein the spring is configured to press against the support to compensate for play between the mounting and the support.

2. The mounting of claim 1, wherein the guide has at least one groove through which a T-shaped or a dovetail-shaped guide is formed.

3. The mounting of claim 1, wherein the guide has two parallel and mutually spaced grooves between which the plurality of latching teeth of the guide are disposed.

4. The mounting of claim 1, wherein the latching teeth are saw-toothed shaped.

5. The mounting of claim 1, further comprising:
   a spring element formed on the at least one linearly displaceable guided slide, wherein the spring element is arranged to press the at least one linearly displaceable guided slide into the guide so that the plurality of interlocking latching teeth of the guide and the at least one linearly displaceable guided slide engage one another.

6. The mounting of claim 1, wherein the slide has, on a side facing the latching teeth of the guide, a portion having no latching teeth and configured to enable levering of the at least one linearly displaceable guided slide out of the latching positions by tilting the at least one linearly displaceable guided slide.

7. The mounting of claim 6, further comprising:
   handle elements formed on the at least one linearly displaceable guided slide and configured to tilt the at least one linearly displaceable guided slide.

8. The mounting of claim 7, wherein the handle elements comprise a handle eyelet and a pressure tab.

9. The mounting of claim 1, further comprising:
   a further guide, which encloses the support, is arranged on the at least one linearly displaceable guided slide.

10. The mounting of claim 9, further comprising:
    a further guide formed on the at least one linearly displaceable guided slide, the further guide is configured to guide a further slide in a linearly displaceable manner, wherein the further slide includes a plurality of latching positions and a clamping section configured to bear against the support.

11. The mounting of claim 10, wherein the further guide and the further slide have mutually engaging latching teeth by which the plurality of latching positions are formed.

12. The mounting of claim 11, wherein a base body of the guide, the at least one linearly displaceable guided slide, or the at least one linearly displaceable guided slide with the further guide and/or the further slide with the clamping section are each produced integrally from plastic.

13. The mounting of claim 12, wherein the plastic is a conductive plastic and/or a plastic with a conductive coating.

14. The mounting of claim 10, wherein the guide and the further guide are aligned perpendicularly to one another.

15. The mounting of claim 1, further comprising:
    a base body comprising a hook-shaped element configured to hook an edge of the support.

16. A sensor module for use in a storage or transport system, the sensor module comprising:
    a mounting for use in a storage or transport system for fastening the sensor module to a support of the storage or transport system, the mounting comprising
       a clamping device configured to clamp the mounting to the support,
       wherein the clamping device comprises at least one linearly displaceable guided slide that engages in a plurality of latching positions;
       a guide, in which the at least one linearly displaceable guided slide is guided, is arranged or formed on the mounting, wherein the guide and the at least one linearly displaceable guided slide have a plurality of interlocking latching teeth forming the plurality of latching positions; and
       a spring formed on the at least one linearly displaceable guided slide, wherein the spring is configured to press against the support to compensate for play between the mounting and the support.

* * * * *